United States Patent [19]

Bergles

[11] 4,231,264
[45] Nov. 4, 1980

[54] DERAILLEUR MECHANISM
[75] Inventor: Eduard Bergles, Graz, Austria
[73] Assignee: Fichtel & Sachs AG, Schweinfurt, Fed. Rep. of Germany
[21] Appl. No.: 936,569
[22] Filed: Aug. 22, 1978
[30] Foreign Application Priority Data
  Sep. 2, 1977 [DE] Fed. Rep. of Germany ....... 2739543
[51] Int. Cl.² .............................................. F16H 7/22
[52] U.S. Cl. ..................................................... 474/80
[58] Field of Search ..................... 74/217 B, 242.11 B, 74/242.14 B, 242.15 B; 280/236, 237, 238
[56] References Cited
  U.S. PATENT DOCUMENTS
  3,910,136  10/1975  Juy ..................................... 74/217 B
  3,927,904  12/1975  Bergles .............................. 74/217 B
  FOREIGN PATENT DOCUMENTS
  2739543  3/1979  Fed. Rep. of Germany ......... 74/217 B Primary Examiner—C. J. Husar
Assistant Examiner—Conrad Berman
Attorney, Agent, or Firm—Toren, McGeady and Stanger

[57] ABSTRACT

The supporting structure of a rear wheel derailleur mechanism for the rear wheel of a bicycle or like vehicle is connected to the carrier element for a chain guiding sprocket by an elongated link and an elongated guide. First and second pivots connect respective first longitudinal end portions of the link and guide to the supporting structure, and third and fourth pivots connect the second longitudinal end portions of the link and guide to the carrier element. A fifth pivot connects respective intersecting central portions of the link and guide. The axes of the several pivots are at least approximately parallel. The three pivots associated with the link practically prevent shifting of their pivot axes relative to the link and the connected devices, whereas the pivots at the end portions of the guide permit translatory movement of their pivot axes. A chain wheel is mounted on the carrier element for rotation in a plane transverse to the axis of rotation of the associated rear wheel, and the link and guide may be pivoted manually relative to each other about the axis of the fifth pivot.

29 Claims, 10 Drawing Figures

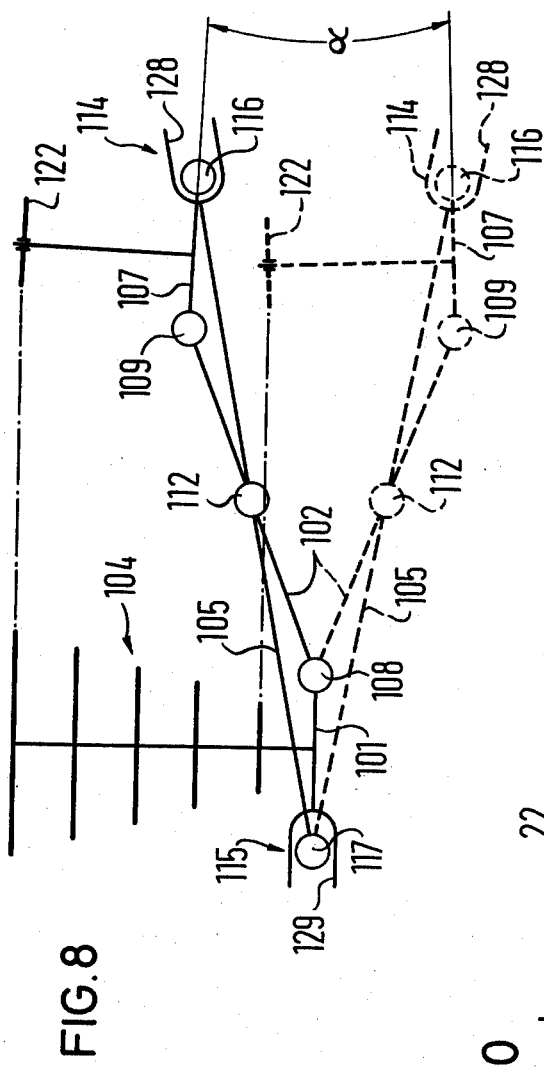
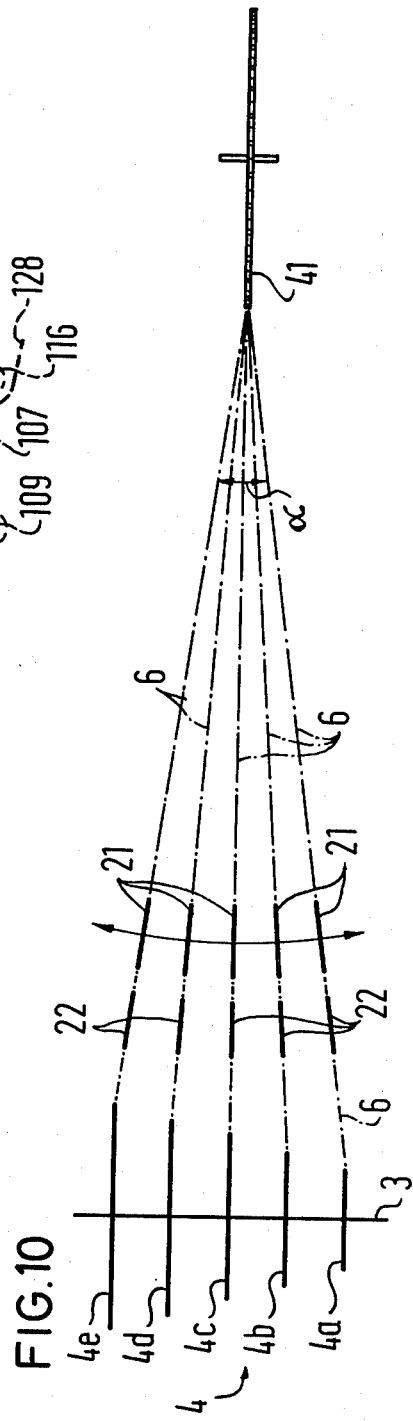
FIG.8
FIG.10

DERAILLEUR MECHANISM

This invention relates to variable speed transmissions between the pedal crank shaft and the rear wheel of a bicycle and like vehicle, and particularly to a derailleur mechanism suitable for such use.

It is well known to attach a conical cluster of gear wheels to the rear wheel of a bicycle and to train a drive chain over a chain wheel on the pedal crank shaft and alternatively over the gear wheels of the cluster to achieve a desired transmission ratio. The chain is shifted between the several gear wheels of the cluster by a chain wheel or guide sprocket mounted on the bicycle frame near the rear wheel shaft and shifted in the direction of the axis of rear wheel rotation by a manual control device, such as a bowden cable.

In the known derailleur devices, the guide sprocket is fastened to the supporting structure of the vehicle by a four-bar, parallelogram linkage whose effective width in the direction of the axis of rear wheel rotation is varied by the manual control device. The conventional linkage is relatively wide in the direction of sprocket movement so that it projects laterally from the bicycle frame and is easily damaged in the event of a spill. It may also snag the clothing of a careless rider during mounting and dismounting.

A primary object of the invention is the provision of a derailleur mechanism whose linkage is narrower transversely to the direction of normal bicycle movement than a parallelogram linkage of comparable mechanical strength and effectiveness.

With this object and others in view, the invention provides a derailleur mechanism for the rear wheel of a vehicle whose support element may be mounted on the associated vehicle in a fixed position relative to the axis of rotation of the vehicle wheel. Respective first longitudinal end portions of an elongated link and of an elongated guide are connected to the support element by first and second pivots. Third and fourth pivots, respectively, connect the second longitudinal end portions of the link and guide to a carrier element. A fifth pivot connects intermediate portions of the link and guide to each other. The axes of the five pivots extend in a common direction. The first, third, and fifth pivots prevent significant longitudinal movement of the link relative to the support element, the carrier element, and the guide. The second and fourth pivots permit longitudinal movement of the end portions of the guide relative to the respective elements. A chain wheel is mounted on the carrier element for rotation in a plane transverse to the axis of rotation of the vehicle wheel. A manual operating device permits the link and guide to be moved relative to each other about the axis of the fifth pivot.

Other features, additional objects, and many of the attendant advantages of this invention will readily be appreciated as the same becomes better understood from the following detailed description of preferred embodiments when considered in connection with the appended drawing in which:

FIG. 8 shows a modified mechanism of the invention in the manner of FIGS. 2 and 3;

FIG. 10 diagrammatically illustrates the mode of operation of a derailleur mechanism of the invention in a top plan view.

Figure 1:
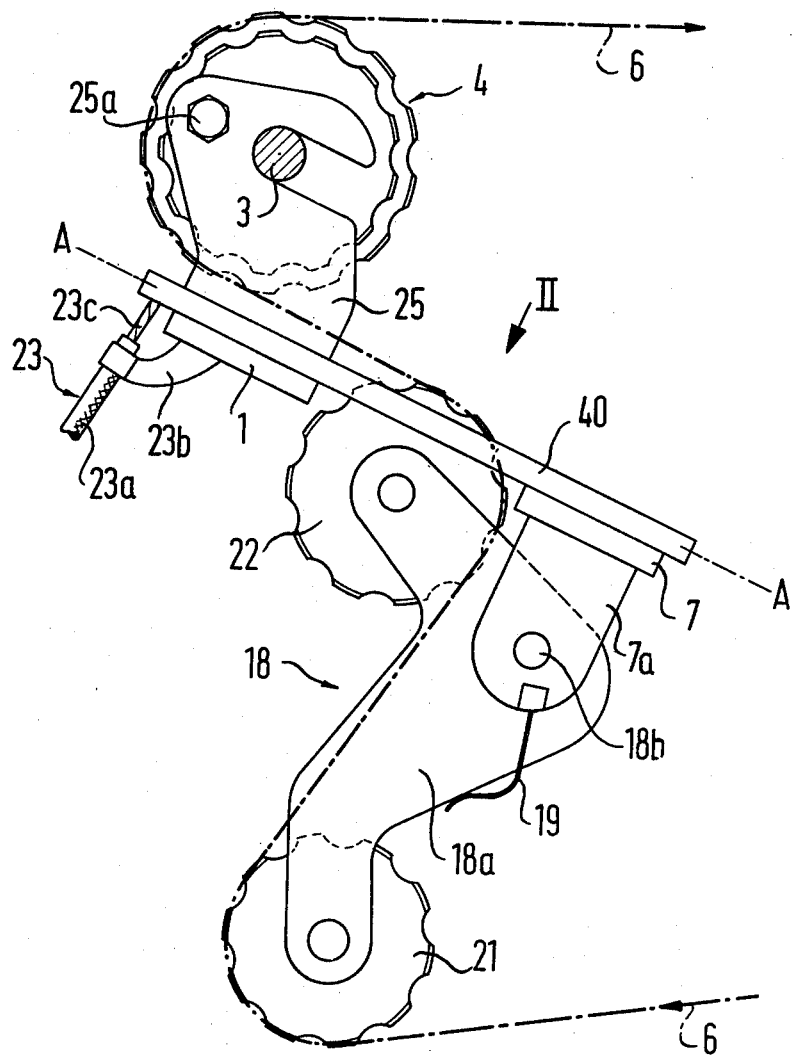
FIG. 1 shows a rear derailleur mechanism of the invention in simplified side elevation.

Referring now to the drawing in detail, and initially to FIG. 1, there is shown only as much of a bicycle equipped with a rear derailleur mechanism as is needed for an understanding of basic aspects of the invention.

A bearing bracket 1 is suspended from the bicycle frame by means of a lug 25 hooked over the rear wheel shaft 3. The angular position of the lug 25 on the shaft 3 is secured by a screw 25a engaging a member of the non-illustrated rear-wheel fork of the bicycle frame. A conical gear cluster 4 rotates about the axis of the shaft 3 and is drivingly fastened to the rear wheel (not shown) for rotating the wheel when a chain 6 turns a gear in the cluster. A linkage 40, yet to be described in detail, connects the bearing bracket 1 to another bearing bracket 7. The cage 18a of a chain tensioning and guiding device 18 is fixedly suspended from the bracket 7 by means of a lug 7a and a shaft 18b. A leaf spring 19 biases the cage 18a clockwise, as viewed in FIG. 1. The chain 6 is trained over two sprockets 21, 22 in the cage 18a to a gear in the cluster 4 in such a manner that the sprockets 21, 22 biased by the spring 19 absorb any slack that may develop in the chain 6 when shifted from a larger gear in the cluster 4 to a smaller one by movement of the bearing bracket 7 and of the sprockets 21, 22 axially of the shaft 3. Movement of the bearing bracket 7 and of the attached chain tensioning device 18 is manually controlled by means of a bowden cable 23 whose sheath or compression member 23a is secured to the bearing bracket 1 by a stud 23b while the wire or tension member 23c in the sheath engages a movable element of the linkage 40. Except for the linkage 40, the structure described so far is analogous to the conventional type of derailleur mechanism in which the linkage 40 is replaced by a four-bar, parallelogram connection straightened by pulling the wire 23c.

Figure 2:
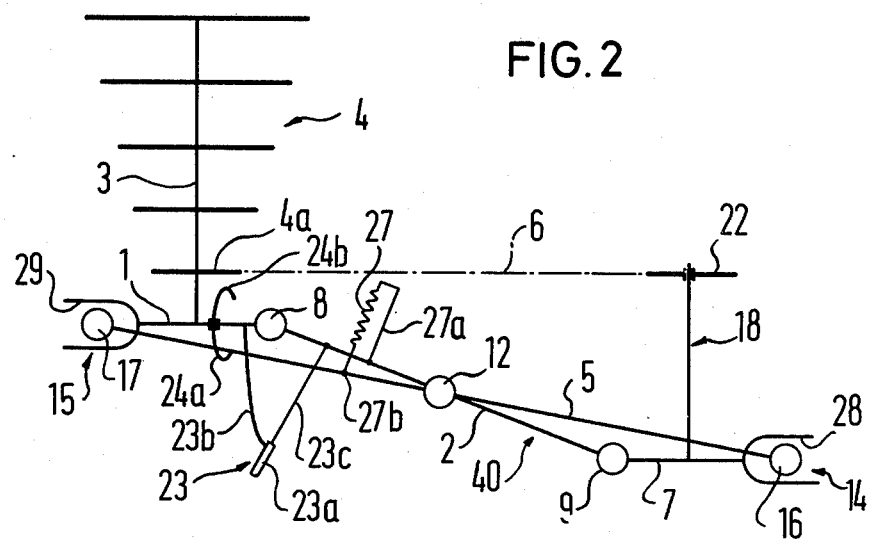
FIG. 2 shows the mechanism of FIG. 1 in oblique top view in the direction of the arrow II in FIG. 1, structural elements being represented by conventional symbols.

The linkage 40 and associated elements of the mechanism shown in FIG. 1 are represented in FIG. 2 by conventional symbols. The rear wheel shaft 3 rotatably carries the five gear wheels of the cluster 4 and the bearing bracket 1 which normally is fixedly fastened to the frame and the shaft 3. The chain 6 is trained from the sprocket 22 to the smallest gear wheel 4a in the illustrated position of the chain guiding device 18.

A link 2, which is a two-armed lever, and a guide bar 5 are the principal elements of the linkage 40. The end of one of the two equal arms of the link 2 is attached to the near end of the bearing bracket 1 by a pivot 8 whose axis is perpendicular to the plane A—A indicated in FIG. 1 and fixed relative to the bearing bracket 1 except for manufacturing tolerances. The other arm of the link 2 is similarly attached to the bearing bracket 7 by a pivot 9. Another pivot 12 provides a central fulcrum for the link 2 on the center of the guide bar 5. Slots 28, 29 in the ends of the bearing brackets 7, 1 remote from the fulcrum 12 are open in opposite directions away from each other to receive hinge pins 16, 17 on respective ends of the guide bar, thus providing the guide bar with two sliding bearings 14, 15 which permit movement relative to the brackets 7, 1 in the direction of elongation of the bar 5 as well as angular movement.

The pivoting movement of the guide bar 5 parallel to the plane A—A is limited by two abutments 24a, 24b on the bearing bracket 1. The bar 5 is engaged with the abutment 24a, as is shown in FIG. 1, by the tension of the bowden wire 23c against the biasing force of a return spring 27, represented in FIG. 2 by a helical wire spring tensioned between fasteners 27a, 27b on the link 2 and the bar 5 respectively. When the wire 23c is relaxed, the spring 27 moves the linkage 40 toward the position of FIG. 3 in which the bar 5 engages the abutment 24b, and the sprocket 22 is aligned with the largest gear wheel 4e in the cluster 4, other gear wheels receiving the chain 6 in positions of the linkage 40 intermediate those of FIGS. 2 and 3.

Figure 3:
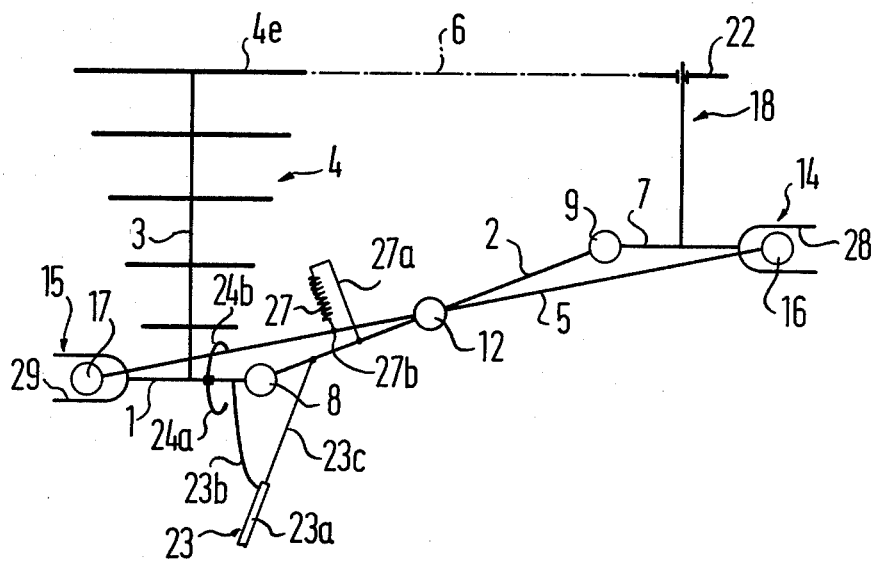
FIG. 3 illustrates the mechanism of FIG. 2 in a different operative position.

As will become evident hereinafter, the tension spring 27 may be replaced by a torsion spring at the fulcrum 12 or at the pivots 8, 9. The dimensional changes in the spring, as is shown in FIGS. 2 and 3 for the spring 27, are quite small over the full range of movement of the linkage 40. Therefore, the resistance of the spring to deformation by the bowden cable 23 remains fairly uniform, a desirable feature.

The width of the linkage 40 axially of the shaft 3 is small, and the derailleur mechanisms of the invention project laterally from the bicycle frame only a very short distance, smaller than the corresponding dimension of the conventional parallelogram linkages. The probability of damage to the mechanism in the event of a spill is thus reduced, and snagging of the rider's clothing is less likely.

In derailleur mechanisms of the invention based on the features illustrated in FIGS. 2 and 3, the chain guiding device 18 is moved by the bowden cable 23 parallel to the axes of the gear cluster 4 and of the sprockets 21, 22. Precise alignment between the sprocket 22 and the respective gear wheels at the several transmission ratios can be maintained only by shifting the guiding device 18 over distances equal to the axial spacings of the gear wheels in the cluster. This is not always desirable or even feasible, and some friction losses and accelerated chain wear cannot be avoided if precise alignment is not achieved.

As is shown in FIG. 10, a path of the guiding device 18 shorter than the spacing of the gear wheels 4a to 4e in the cluster 4 has only minimal effects on chain friction and chain wear if the guiding device 18 moves in a shallow arc indicated in FIG. 10 by a double arrow. The lower strand of the chain 6 moves from the chain wheel 41 on the pedal crank shaft over the sprockets 21, 22 to each gear in the cluster 4 in a plane which appears as a straight line in the projected view of FIG. 10. The chain paths indicated are achieved by superimposing a slight tilting movement on the axial movement of the guiding device 18 for the sprockets 21, 22 to compensate for the angle α through which the chain 6 moves at the chain wheel 41 during shifting from the gear 4a to the gear 4e.

A modified derailleur mechanism producing the desired tilting motion of the bearing bracket for the sprocket wheels is illustrated in FIG. 8 by the symbols employed in FIGS. 2 and 3, the position of the mechanism for the lowest transmission ratio being represented by fully drawn lines, the position for highest transmission ratio from the chain wheel, not itself shown in FIG. 8, to the rear wheel being indicated in broken lines. Elements identical with or corresponding to elements described with reference to FIGS. 2 and 3 are designated in FIG. 8 by reference numerals having the same two last digits, but augmented by 100. As far as not explicitly described otherwise, the mechanism of FIG. 8 is identical with that of FIGS. 2 and 3.

In the modified mechanism, the hinged connections 114, 115 between the guide bar 105 and the bearing brackets 101, 107 are provided by elongated slots 128, 129 in the two ends of the bar 105 which are engaged by hinge pins 116, 117 on the brackets 101, 107 respectively. The bracket 107 thereby is tilted through a small angle α in the plane A—A shown in FIG. 1, which is the plane of FIG. 8, during the full available range of movement of the link 102 and the guide bar 105.

An analogous effect can be produced in an obvious manner by shifting the parallel axes of the pivots 8, 9, 12 and of the sliding bearings 14, 15 in the mechanism of FIGS. 2 and 3 so that the axis of the pivot 12 is not centered between the pivots 8, 9 and/or between the bearings 14, 15.

Figure 4:
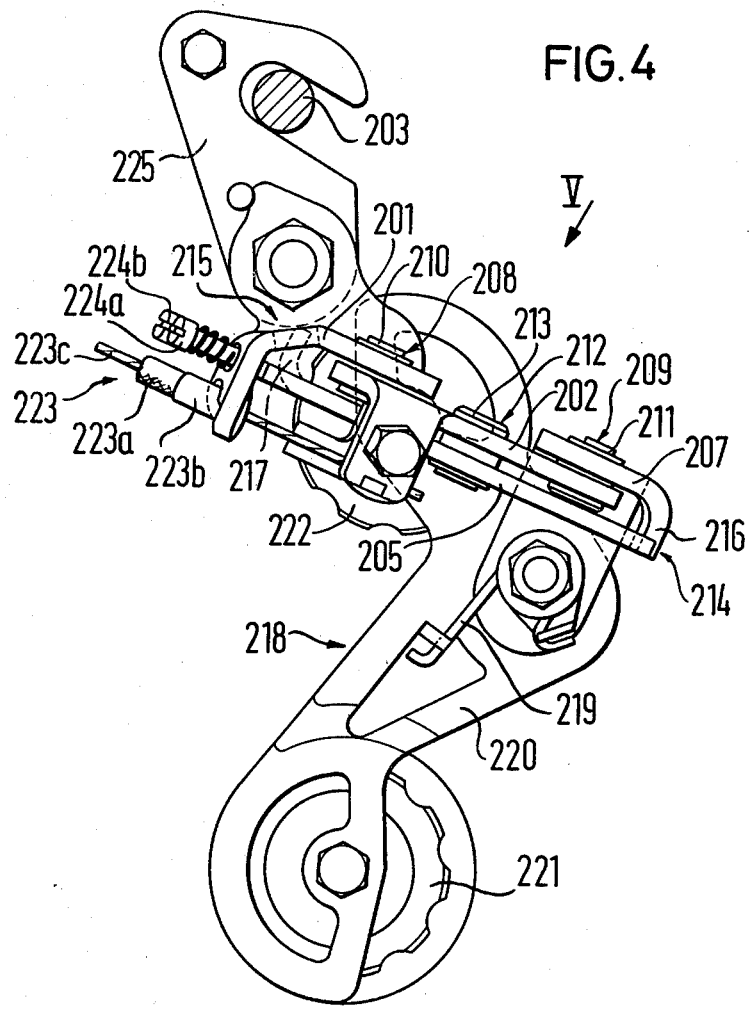
FIG. 4 is a side elevational view of an actual embodiment of the mechanism according to FIGS. 2 and 3.
Figure 5:
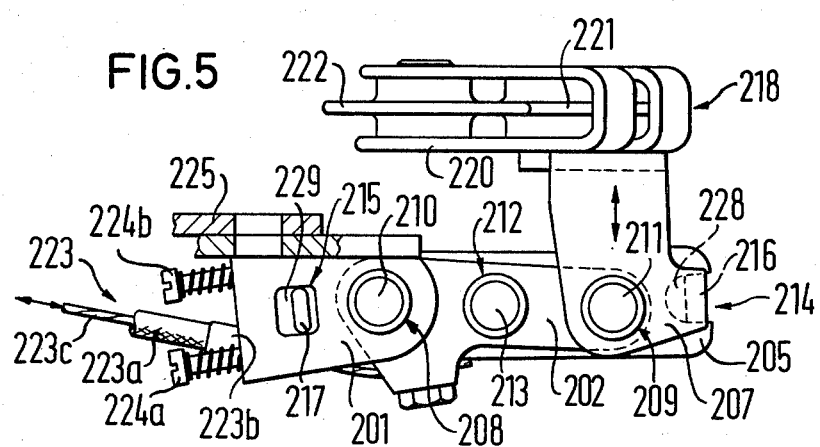
FIG. 5 shows the mechanism of FIG. 4 in oblique top view in the direction of the arrow V, portions being broken away.

An actual embodiment of a derailleur mechanism of the invention including the described features of FIGS. 1 to 3 and 8 is illustrated in FIGS. 4 and 5. Structural elements equivalent to those described with reference to FIGS. 1 to 3 are designated by the same reference numerals augmented by 200.

The derailleur mechanism proper is attached to the non-illustrated bicycle frame by a lug 225 near the rear wheel shaft 203. A bearing bracket 201 is angularly adjustable on the lug 225, but normally fixed. The bearing bracket 201 is connected with a bearing bracket 207 by a link 202 and a guide bar 205. Approximate longitudinal centers of the link 202 and the bar 205 are pivotally connected by a pin 213 of a fulcrum 212. An offset part 217 at one end of the bar 205 is slidably and rotatably received in a longitudinally open, elongated slot 229 of the bearing bracket 201 to provide a sliding bearing 215. A similar bearing 214 is constituted at the other end of the bar 205 on the bearing bracket 207 where a terminal part 216 of the bracket 207 is received in a slot 228 of the guide bar 205, as described with reference to FIG. 8.

A pivot 209 including a pivot pin 211 connects the bearing bracket 207 with the link 202, and a pivot 208 including a pivot pin 210 connects the bracket 201 with the link 202. The bracket 207 carries the chain guiding and tensioning device 218 including a pivotally mounted carrier arm 220 biased by a spiral spring 219, a tensioning sprocket 221 and a guiding sprocket 222. Two set screws 224a, 224b on the bearing bracket 201 limit the angular movements of the bar 205 and the link 202, and a tubular stud 223b on the same bearing bracket abuttingly engages the sheath 223a of a bowden cable 223. The tension wire 223c of the cable is attached to the link 202.

The mode of operation of the embodiment of FIGS. 4 and 5 is obvious from the preceding description of FIGS. 1 to 3, 8, and 10.

Figure 6:
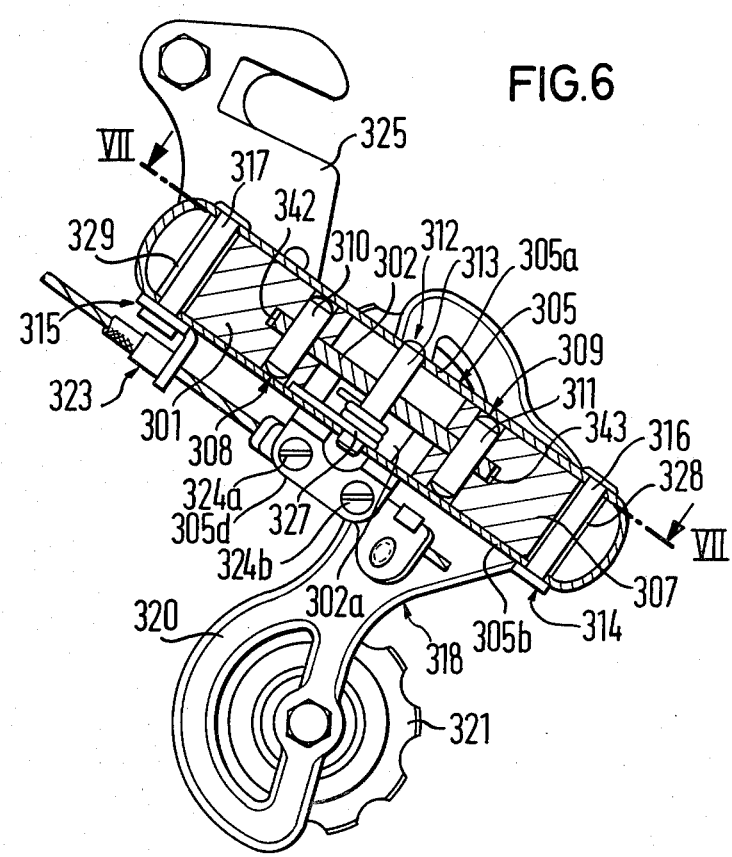
FIG. 6 shows another actual embodiment of the mechanism according to FIGS. 2 and 3 in side elevation and partially in section on the line VI—VI in FIG. 7.
Figure 7:
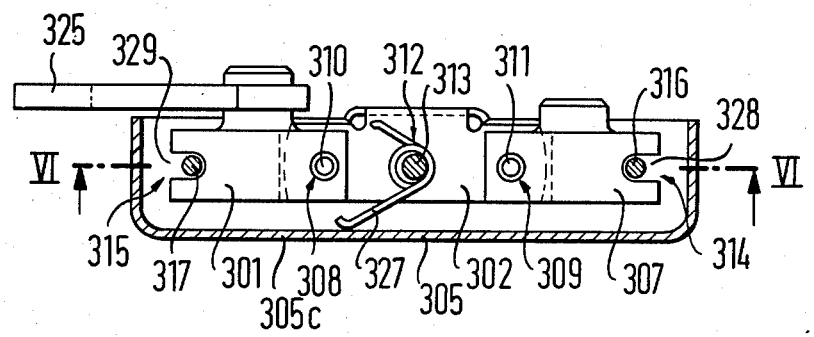
FIG. 7 illustrates the mechanism of FIG. 6 in section on the line VI—VI.

Another actual embodiment of the invention is shown in FIGS. 6 and 7, and elements corresponding in structure and/or function to the afore-described elements in FIGS. 1 to 3 are designated by the same reference numerals augmented by 300.

A guide member 305 has the shape of an elongated vessel or casing closed in both longitudinal directions and of approximately U-shaped cross section so that two longitudinal walls 305a, 305b bound a lateral open side of the casing 305. The cavity of the casing 305 receives two bearing brackets 301, 307 in longitudinally spaced relationship and a flat link 302. The casing 305 is pivotally connected with the bearing brackets 301, 307 by sliding bearings 314, 315, and with the link 302 by a fulcrum 312.

The two bearing brackets 301, 307 are practically identical and their portions remote from each other are formed with longitudinally open, elongated slots 329, 328. Pivot pins 316, 317 riveted between the casing walls 305a, 305b are slidably and rotatably received in the slots respectively. Pivot pins 310, 311, 313 of pivots 308, 309, 312 are mounted at the ends and in the approximate center of the link 302 by press fits and thereby secured axially. The link 302 is movably received in respective slots 342, 343 of the bearing brackets 301, 307, and the pins 310, 311 are journaled in the brackets. A spiral return spring 327 is coiled about the pivot pin 312. It engages a longitudinal wall 305c of the casing 305 and a flange 302a of the link 302. A lug 325, fixedly, but adjustably attached to the bearing bracket 301, normally supports the derailleur arrangement on the bicycle frame in a manner obvious from FIG. 1.

A carrier arm 320 is pivotally mounted on the bearing bracket 307 in a manner apparent from the analogous showing of FIGS. 1 and 4 and carries a tensioning sprocket 321 and a guide sprocket, obscured in FIGS. 6 and 7. Two set screws 324a, 324b are mounted on a flange 305d of the casing 305. They abut against a non-illustrated flange of the link 302 in the two terminal positions of relative angular movement of the link 302 and the casing 305. Except for the readily accessible heads of the screws 324a, 324b, the adjustable abutment arrangement is thus confined within the space required by other elements of the derailleur mechanism.

Figure 9:
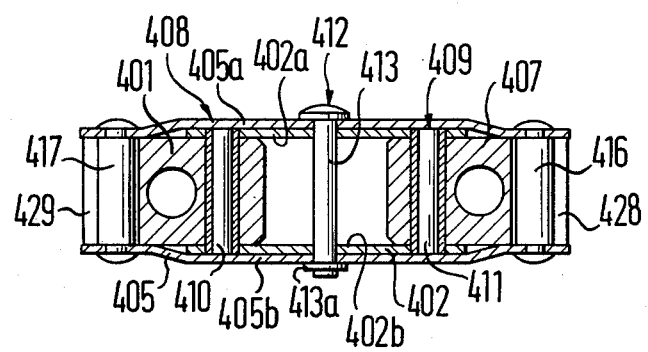
FIG. 9 shows elements of a third embodiment of the invention in a view analogous to that of FIG. 6.

A variant of the linkage described above with reference to FIG. 6 is illustrated in FIG. 9 in a corresponding sectional view. Elements structurally or functionally equivalent to elements illustrated in FIGS. 2 and 3 are designated by the same reference numerals augmented by 400.

The linkage seen in FIG. 9 includes a link 402 and a guide member 405 which are both channels of approximately U-shaped cross section and elongated in a common direction. The flanges 402a, 402b of the link 402 are closely juxtaposed to the flanges 405a, 405b of the guide member 405 in whose cavity the link 402 is received. To permit bearing brackets 401, 407 to be mounted in a simple manner, the longitudinal ends of the flanges 405a, 405b which project beyond the link 402 are offset toward each other by the approximate thickness of the link flanges 402a, 402b.

Hinge pins 416, 417 are fastened by riveting between the flanges of the guide member 405 before assembly of the guide member with other structure of the derailleur mechanism. Pivot pins 410, 411 of the pivots 408, 409 which connect the link 402 to the bearing brackets 401, 407 may be fastened in the flanges 402a, 402b and are further secured against axial displacement by the flanges of the guide member 405 which envelops the link 402. The pivot pin 412 of a fulcrum 412 passes rotatably through aligned, closely fitting bores in the flanges 402a, 402b, 405a, 405b and is secured axially by an enlarged head at one end, and a spring clip 413a on the other end. The linkage shown in FIG. 9 is distinguished by high rigidity of the connected link 402 and guide member 405.

As has been shown explicitly in FIGS. 4 and 5, features of the basic mechanisms diagrammatically illustrated in FIGS. 2 and 3 and in FIG. 8, respectively, may be interchanged or employed jointly, and other variations and permutations will readily suggest themselves. Thus, FIG. 2 shows a link 2 having two arms of equal length extending in opposite directions from a fulcrum 12. As has been mentioned above, the arms may be made of different length to achieve an arcuate path of movement for the guiding mechanism 18. The links illustrated in the several figures of the drawing are shorter than the cooperating guide members, but the opposite relationship is feasible in a suitably modified device. The pivots 8, 9, 13 do not permit significant movement of the connected members transverse to the respective pivot axes, while both angular movement and limited radial displacement is available at the sliding bearings 14, 15. However, a sliding bearing may connect the central portions of the link 2 and the guide bar 5 if one of the bearings 14, 15 is replaced by a radially fixed pivot.

It should be understood, therefore, that the foregoing disclosure relates only to presently preferred embodiments, and that it is intended to cover all changes and modifications of the examples of the invention herein chosen for the purpose of the disclosure which do not constitute departures from the spirit and scope of the invention set forth in the appended claims.

What is claimed is:

1. A derailleur mechanism for the rear wheel of a bicycle and like vehicle comprising:
   (a) a support element;
   (b) mounting means for mounting said support element on said vehicle in a fixed position relative to the axis of rotation of said wheel;
   (c) an elongated link member;
   (d) an elongated guide member, each of said members including first and second longitudinal end portions;
   (e) first and second pivot means respectively connecting said first longitudinal end portions to said support element for angular movement of said members relative to said support element;
   (f) a carrier element;
   (g) third and fourth pivot means respectively connecting said second longitudinal end portions to said carrier element for angular movement of said members relative to said carrier element;
   (h) fifth pivot means connecting respective portions of said members intermediate said end portions thereof for relative angular movement of said members,
      (1) said pivot means defining respective pivot axes extending in a common direction,
      (2) said first, third, and fifth pivot means preventing significant longitudinal movement of said link member relative to said support element, said carrier element, and said guide member respectively,
      (3) said second and fourth pivot means permitting movement of said end portions of said guide member substantially in the direction of guide member elongation relative to said elements respectively;
(i) a chain wheel mounted on said carrier element for rotation in a plane substantially transverse to said axis of rotation in said fixed position of said support element; and
(j) operating means for moving said members relative to each other about the pivot axis of said fifth pivot means.

2. A mechanism as set forth in claim 1, wherein said members are offset from each other in said common direction.

3. A mechanism as set forth in claim 1, wherein said guide member is channel-shaped and envelops at least respective portions of said elements and of said link member.

4. A mechanism as set forth in claim 1, wherein said guide member has the shape of an elongated casing closed in a longitudinal direction and receiving therein at least respective portions of said elements and of said link member.

5. A mechanism as set forth in claim 1, wherein said elements are formed with respective slots in a common plane, said end portions of the link member being movably received in said slots, said first and third pivot means including respective pin members fixedly mounted in said end portions and projecting therefrom into respective bores of said elements.

6. A mechanism as set forth in claim 1, wherein each of said members is approximately channel-shaped and includes two spacedly parallel, longitudinal flange portions, said link member being received between the flange portions of said guide member, and the flange portions of said link member receiving therebetween respective parts of said elements, said first and third pivot means including respective pin members axially secured in the flange portions of said link member and passing through said parts, said fifth pivot means including a pin member passing through the flange portions of said link member and of said guide member.

7. A mechanism as set forth in claim 1, wherein said fifth pivot means include a pin member fixedly fastened to said link member and journaled in said guide member.

8. A mechanism as set forth in claim 1, wherein at least one of said second and fourth pivot means includes a pivot pin member mounted on the associated element, the associated end portion of said guide member being formed with an elongated slot receiving said pivot pin member for angular and translatory movement.

9. A mechanism as set forth in claim 1, wherein at least one of said second and fourth pivot means includes a pivot pin member mounted on the associated end portion of said guide member, the associated element being formed with an elongated slot receiving said pivot pin member for angular and translatory movement.

10. A mechanism as set forth in claim 1, wherein said fifth pivot means include a pivot pin member engaging each of said members, and an elongated spring coiled about said pivot pin member and having respective longitudinally terminal portions engaging said link member and said guide member.

11. A mechanism as set forth in claim 1, wherein said elements have respective, substantially identical parts connected to said members by said first, second, third, and fourth pivot means.

12. A mechanism as set forth in claim 1, wherein said second pivot means include a first pivot pin member fixed on said guide member, said support element being formed with an elongated opening receiving said pivot pin member for angular and translatory movement, and said fourth pivot means include a second pivot pin member fixed on said carrier element, said guide member being formed with an elongated opening receiving said second pivot pin member for angular and translatory movement.

13. A mechanism as set forth in claim 1, wherein the distances between the pivot axis of said fifth pivot means and the respective pivot axes of said first and third pivot means associated with the longitudinal end portions of one of said members are different.

14. A mechanism as set forth in claim 1, wherein the pivot axes of said first and third pivot means are nearer the pivot axis of said fifth pivot means than the pivot axes of said second and fourth pivot means, and said elements include respective bearing brackets connected by said first, second, third, and fourth pivot means to said members.

15. A derailleur mechanism for the rear wheel of a bicycle and like vehicle comprising:
(a) a support element;
(b) mounting means for mounting said support element on said vehicle in a fixed position relative to the axis of rotation of said wheel;
(c) an elongated link member;
(d) an elongated guide member, each of said members including first and second longitudinal end portions;
(e) first and second pivot means respectively connecting said first longitudinal end portions to said support element for angular movement of said members relative to said support element;
(f) a carrier element;
(g) third and fourth pivot means respectively connecting said second longitudinal end portions to said carrier element for angular movement of said members relative to said carrier element;
(h) fifth pivot means connecting respective portions of said members intermediate said end portions thereof for relative angular movement of said members,
 (1) said pivot means defining respective pivot axes extending in a common direction,
 (2) three of said pivot means preventing significant relative translatory movement of the connected members and elements transversely to the respective pivot axes,
 (3) the two other pivot means permitting said translatory movement;
(i) a first chain wheel mounted on said carrier element for rotation in a plane approximately perpendicular to said axis of rotation in said fixed position of said support; and
(j) operating means for moving said members relative to each other about the pivot axis of said fifth pivot means.

16. A mechanism as set forth in claim 15, including
(a) a plurality of gear wheels coaxially mounted on said rear wheel of the vehicle for common rotation therewith,
(b) a second chain mounted on a pedal crank shaft of the vehicle, a chain running around a selected one of said gear wheels according to the relative position of said members relative to each other, further around said first chain wheel and further around said second chain wheel, and (c) said pivot means being so arranged with respect to said members and to said elements that the angle $\alpha$ of inclination of the plane of rotation of said first chain wheel with respect to the axis of rotation of the rear wheel is varied, when said members are moved relative to each other so that the plane of rotation of said first chain wheel is always substantially parallel to the path of said chain between the selected one of said gear wheels and said second gear wheel regardless of the selected one of said gear wheels over which the chain is running.

17. A mechanism as set forth in claim 15, wherein said members are offset from each other in said common direction.

18. A mechanism as set forth in claim 15, wherein said guide member is channel-shaped and envelops at least respective portions of said elements and of said link member.

19. A mechanism as set forth in claim 15, wherein said guide member has the shape of an elongated casing closed in a longitudinal direction and receiving therein at least respective portions of said elements and of said link member.

20. A mechanism as set forth in claim 15, wherein said elements are formed with respective slots in a common plane, said end portions of the link member being movably received in said slots, said first and third pivot means including respective pin members fixedly mounted in said end portions and projecting therefrom into respective bores of said elements.

21. A mechanism as set forth in claim 15, wherein each of said members is approximately channel-shaped and includes two spacedly parallel, longitudinal flange portions, said link member being received between the flange portions of said guide member, and the flange portions of said link member receiving therebetween respective parts of said elements, said first and third pivot means including respective pin members axially secured in the flange portions of said link member and passing through said parts, said fifth pivot means including a pin member passing through the flange portions of said link member and of said guide member.

22. A mechanism as set forth in claim 15, wherein said fifth pivot means include a pin member fixedly fastened to said link member and journaled in said guide member.

23. A mechanism as set forth in claim 15, wherein at least one of said second and fourth pivot means includes a pivot pin member mounted on the associated element, the associated end portion of said guide member being formed with an elongated slot receiving said pivot pin member for angular and translatory movement.

24. A mechanism as set forth in claim 15, wherein at least one of said second and fourth pivot means includes a pivot pin member mounted on the associated end portion of said guide member, the associated element being formed with an elongated slot receiving said pivot pin member for angular and translatory movement.

25. A mechanism as set forth in claim 15, wherein said fifth pivot means include a pivot pin member engaging each of said members, and an elongated spring coiled about said pivot pin member and having respective longitudinally terminal portions engaging said link member and said guide member.

26. A mechanism as set forth in claim 15, wherein said elements have respective, substantially identical parts connected to said members by said first, second, third, and fourth pivot means.

27. A mechanism as set forth in claim 15, wherein said second pivot means include a first pivot pin member fixed on said guide member, said support element being formed with an elongated opening receiving said pivot pin member for angular and translatory movement, and said fourth pivot means include a second pivot pin member fixed on said carrier element, said guide member being formed with an elongated opening receiving said second pivot pin member for angular and translatory movement.

28. A mechanism as set forth in claim 15, wherein the distances between the pivot axis of said fifth pivot means and the respective pivot axes of said first and third pivot means associated with the longitudinal end portions of one of said members are different.

29. A mechanism as set forth in claim 15, wherein the pivot axes of said first and third pivot means are nearer the pivot axis of said fifth pivot means than the pivot axes of said second and fourth pivot means, and said elements include respective bearing brackets connected by said first, second, third and fourth pivot means to said member.

* * * * *